United States Patent
Kim et al.

(10) Patent No.: US 6,613,826 B2
(45) Date of Patent: Sep. 2, 2003

(54) AQUEOUS COATING COMPOSITION

(75) Inventors: Juhan Kim, Annarbor, MI (US); Jeffrey Makarewicz, Annarbor, MI (US); Jesse Fritcher, Lansing, IL (US)

(73) Assignees: Toyota Technical Center, U.S.A., Inc., Annarbor, MI (US); Nippon Bee Research America, Inc., Lansing, IL (US)

( * ) Notice: Subject to any disclaimer, the term of this patent is extended or adjusted under 35 U.S.C. 154(b) by 20 days.

(21) Appl. No.: 09/943,986

(22) Filed: Sep. 1, 2001

(65) Prior Publication Data

US 2003/0050371 A1 Mar. 13, 2003

(51) Int. Cl.[7] .............. C08J 5/10; C08K 5/05; C08L 23/12
(52) U.S. Cl. ............ 524/386; 524/261; 524/267; 524/388
(58) Field of Search .............. 524/267, 386, 524/388, 261

(56) References Cited

U.S. PATENT DOCUMENTS 4,886,704 A * 12/1989 Kamada et al. ............ 428/323
6,262,160 B1 * 7/2001 Kawano et al. ............ 524/378

* cited by examiner

*Primary Examiner*—James J. Seidleck
*Assistant Examiner*—U. K. Rajguru
(74) *Attorney, Agent, or Firm*—Haugen Law Firm PLLP

(57) ABSTRACT

The present invention provides: a high viscosity aqueous coating composition, which can be coated onto plastic materials such as polyolefin materials by a HVLP gun, and which has excellent sagging performance and can obtain a coating film with good appearance. The aqueous coating composition comprises an acetylene diol defoamer and a silicone wetting agent in addition to a film-formable component, wherein the nonvolatile solid content of the acetylene diol defoamer is in the range of 0.25 to 1.0 weight % of the entirety of the aqueous coating composition, and the nonvolatile solid content of the silicone wetting agent is in the range of 0.75 to 2.0 weight % of the entirety of the aqueous coating composition.

1 Claim, No Drawings

AQUEOUS COATING COMPOSITION

BACKGROUND OF THE INVENTION

A. Technical Field

The present invention relates to an aqueous coating composition which can improve poor appearance caused when plastic materials are directly coated with the composition by a high-volume-low-pressure (HVLP) gun, namely, which gives good sprayability.

B. Background Art

Plastic materials utilized for automotive interior parts include polypropylene (PP), acrylonitrile-butadiene-styrene (ABS), poly(phenylene oxide) (PPO) and polycarbonate (PC). In recent years, polyolefin materials are getting often used in view of cost and recyclability.

Until now, these plastic materials were coated with organic solvent type paints or aqueous paints by spray guns, such as a HVLP gun and a conventional air-spray gun.

Among these conventional coating methods, the combination of the aqueous paint and the HVLP gun is regarded as important in recent years because of environmental conservation and reducing cost.

However, water is evaporated a little when the aqueous paint is sprayed. Then, the viscosity rises a little after spray-coating and the aqueous paint is easily sagged. Therefore, the viscosity of the paint should be determined higher. However, a high viscosity paint is difficult to atomize. Particularly, bubbles occur by use of a low-pressure-atomizing-type paint and causes poor appearance.

Therefore, a low viscosity paint is used at the sacrifice of sagging performance, or an air-spray gun having good atomizability is used at the sacrifice of transfer efficiency inevitably.

SUMMARY OF THE INVENTION

A. Object of the Invention

An object of the present invention is to provide: a high viscosity aqueous coating composition, which can be coated onto plastic materials such as polyolefin materials by a HVLP gun, and which has excellent sagging performance and can obtain a coating film with good appearance.

B. Disclosure of the Invention

The present inventors made various experiments to solve the above-mentioned problems. As a result, they found the following two phenomena as mechanisms which cause the poor appearance.

That is to say, as is mentioned in the above way, the first phenomenon is that small bubbles generated due to bad atomizability remain on coating film surfaces in the drying step, and therefore, rough appearance is obtained. The second phenomenon is in the following. The plastic material is a material having lower surface tension. However, the high viscosity aqueous paint has higher surface tension. Therefore, the wettability is insufficient, and large bubbles are formed on the interface between the plastic material and the aqueous paint. When the bubbles become flat in the drying step, pin holes and blotchy appearance occur on coating film surfaces.

The present inventors further made various experiments. As a result, they found that an acetylene diol defoamer is effective to the small bubbles, and a silicone wetting agent is effective to the large bubbles. Then, they confirmed that the above-mentioned problems are solved by combining these two kinds of additives and blending them in a specific amount respectively, and they completed the present invention.

Accordingly, an aqueous coating composition, according to the present invention, comprises an acetylene diol defoamer and a silicone wetting agent in addition to a film-formable component, wherein the nonvolatile solid content of the acetylene diol defoamer is in the range of 0.25 to 1.0 weight % of the entirety of the aqueous coating composition, and the nonvolatile solid content of the silicone wetting agent is in the range of 0.75 to 2.0 weight % of the entirety of the aqueous coating composition.

These and other objects and the advantages of the present invention will be more fully apparent from the following detailed disclosure.

DETAILED DESCRIPTION OF THE INVENTION

The aqueous coating composition, according to the present invention, comprises a film-formable component, an acetylene diol defoamer, and a silicone wetting agent as essential components, and can further comprise an organic solvent as a promoter for forming coating films, and other additives such as colorants if necessary.

Hereinafter, these and other components are explained in detail.

[Essential Components Comprised in Coating Composition]
(Film-formable Component)

The film-formable component is not especially limited to the kind if the component is a film-formable resin. This resin is ordinary used as a form of emulsion including this resin (resin emulsion).

These resin emulsions are not especially limited, but examples thereof include an emulsion including a polypropylene chloride resin and/or a water-insoluble acrylic resin.

The polypropylene chloride resin is not especially limited, but example thereof includes a polypropylene derivative comprising a polypropylene chloride moiety and a maleic anhydride moiety as bonded to this propylene chloride moiety.

Examples of the water-insoluble acrylic resin include resins obtained by homopolymerizing or copolymerizing acrylic monomers having a hydroxyl group, acrylic monomers having a carboxyl group, or acrylic monomers having an ester group.

The water-insoluble acrylic resin may be modified by the above polypropylene chloride resin.

The emulsification of the above resins is carried out by conventional methods for producing emulsions as used for paints.

(Acetylene Diol Defoamer)

The acetylene diol defoamer prevents surface flatness defect from being caused by small bubbles which are formed when being coated with a high viscosity paint by a HVLP spray gun.

Examples of the acetylene diol defoamer include Sufinol 104 (made by Air Products), and Dinol 604 (made by Air Products).

(Silicone Wetting Agent)

The silicone wetting agent prevents surface flatness from being damaged by large bubbles which are formed on the interface between the plastic material and the aqueous coating composition according to the present invention.

Examples of silicone wetting agent include Coatosil 1211 (made by Witco Corporation), Polyflow KL-245 (made by Kyoeisha Chemical Co., Ltd.). These silicone wetting agents include dimethylpolysiloxane, and blocked or grafted polymers of alkylene glycols as effective components.

[Aqueous Coating Composition]

In the present invention, the nonvolatile solid content of the acetylene diol defoamer is in the range of 0.25 to 1.0 weight %, preferably 0.35 to 0.75 weight %, more preferably 0.35 to 0.5 weight %, of the entirety of the aqueous coating composition. In case where the nonvolatile solid content of the acetylene diol defoamer is less than 0.25 weight %, the surface flatness is lowered because of the small bubbles. On the other hand, in where the nonvolatile solid content of the acetylene diol defoamer is more than 1.0 weight %, the sagging performance is lowered and the finishing state of coating film surfaces is deteriorated.

In the present invention, the nonvolatile solid content of the silicone wetting agent is in the range of 0.75 to 2.0 weight %, preferably 0.75 to 1.5 weight %, more preferably 0.75 to 1.0 weight %, of the entirety of the aqueous coating composition. In case where the nonvolatile solid content of the silicone wetting agent is less than 0.75 weight %, the surface flatness is lowered because of the large bubbles, and the poor condition such as blotchy appearance is caused. On the other hand, in case where the nonvolatile solid content of the silicone wetting agent is more than 2.0 weight %, the tack remains on the coating film surfaces, and the finishing state of the coating film surfaces is deteriorated.

In the present invention, the content of the film-formable component is not especially limited, but is determined in consideration of the adhesion and economy.

In the aqueous coating composition according to the present invention, other resins may fitly be combined just as a film-formable component in order to raise the toughness of cured coating films.

Water-soluble acrylic resins are the most preferable of the above other aqueous resins, but emulsions of resins other than the water-soluble acrylic resins, such as polyester resin emulsions, polyurethane resin emulsions, epoxy resin emulsions, or amino resin emulsions, may also be combined.

Examples of the water-soluble acrylic resins include resins obtained by copolymerizing acrylic monomers having a hydroxyl group, acrylic monomers having a carboxyl group, or acrylic monomers having an ester group. The water-soluble acrylic resin has an acid value of 30 to 200 KOH mg/g in terms of solid resin content.

The aqueous coating composition, according to the present invention, can further comprise an organic solvent if the ratio thereof is not more than 30 weight % of the entirety of the aqueous coating composition. The inclusion of the organic solvent improves the workability and enhances the dispersibility of such as pigments. However, generally, the absence of the organic solvent has more advantage of enhancing the storage stability of the emulsion and meeting recent regulation on organic solvents.

Examples of the organic solvent include: aromatic hydrocarbons such as toluene and xylene; aliphatic hydrocarbons such as hexane, heptane and octane; alicyclic hydrocarbons such as cyclohexane, methylcyclohexane and cyclopentane; esters such as ethyl acetate, n-butyl acetate, isobutyl acetate and amyl acetate; ethers such as n-butyl ether and isobutyl ether; ketones such as acetone, methyl ethyl ketone, methyl isobutyl ketone and cyclohexanone; alcohols such as methanol, ethanol, isopropanol, n-butanol, 2-butanol, n-propylene glycol and isopropylene glycol; cellosolves such as ethylene glycol monomethyl ether, ethylene glycol monobutyl ether and ethylene glycol monoethyl ether acetate; carbitols such as diethylene glycol monoethyl ether; propylene glycol monoalkyl ethers such as propylene glycol monomethyl ether, propylene glycol monoethyl ether and propylene glycol monobutyl ether; and other solvents such as dioxane, N-methylpyrrolidone, dimethylformamide and diacetone alcohol.

The aqueous coating composition, according to the present invention, can further comprise other components which are usually added to paints, if necessary. Examples thereof include: colorants; fillers such as talc; brilliant pigments such as aluminum flake and mica; additives such as surfactants, neutralizers, stabilizers, thickeners, defoamers, surface conditioners, ultraviolet absorbents, and antioxidants; inorganic fillers such as silica; conductive fillers such as conductive carbon, conductive fillers, and metal powders; and auxiliary components such as organic reformers, and plasticizers.

Examples of colorants, which may be mixed into the present invention aqueous coating composition, include: inorganic pigments such as titanium oxide, carbon black, iron oxide, chromium oxide, and Prussian blue; organic pigments such as azo pigments, anthracene pigments, perylene pigments, quinacridone pigments, indigo pigments, and phthalocyanine pigments; and dyes.

[Objective Materials]

The plastic material, which is an object to which the present invention aqueous coating composition is coated, is not especially limited, but examples thereof include: polyolefins such as polypropylene (PP) and polyethylene (PE); acrylonitrile-styrene (AS), acrylonitrile-butadiene-styrene (ABS), poly(phenylene oxide) (PPO), poly(vinyl chloride) (PVC), polyurethane (PU) and polycarbonate (PC).

[Coating Method]

The method for coating the present invention aqueous coating composition onto the above objective material is preferably performed by HVLP-spray-coating, but the method may be performed by air-spray-coating or airless-spray-coating.

The aqueous coating composition is, for example, coated such that the dried-film thickness will be preferably in the range of 10 to 50 $\mu$m, more preferably 15 to 25 $\mu$m. In the case where the dried-film thickness is less than 10 $\mu$m, the thickness might be too thin to obtain a uniform film. On the other hand, in the case where the dried-film thickness is more than 50 $\mu$m, there tends to cause problems of such as coating film cracking.

The coating film may be cured at room temperature, but is preferably cured by heating at 60 to 80° C. to improve the productability or physical properties.

The coated article as obtained in the above way is coated with the aqueous coating composition according to the present invention. Therefore, the coating film has a good finishing state.

(Effects and Advantages of the Invention)

The aqueous coating composition, according to the present invention, can easily be coated onto plastic materials such as polyolefin materials by a HVLP gun, and which has excellent sagging performance and can obtain a coating film with good appearance.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the below-mentioned examples. In addition, hereinafter, the units "part(s)" and "%" are by weight.

First, resin emulsions A1 to A3 and a pigment paste as used in the Examples and the Comparative Examples were produced in the following way.

Production Example 1

Production of Resin Emulsion A1

First, 24.6 parts of polypropylene chloride resin (chlorine content: 22 weight %, maleic anhydride moiety content: 1.5 weight %, and weight average molecular weight: 60,000), 5.6 parts of an emulsifier (Emulgen 920, made by Kao Corporation), and 9.4 parts of xylene were placed into a four-necked flask as equipped with a stirrer. The charged mixture was heated to 90° C. After the charged mixture was dissolved uniformly, 0.45 part of N-methylmorpholine was added thereto with maintaining the temperature at 85° C. At the same time, 59.95 parts of deionized water was dropped. After the completion of dropping, the resultant mixture was stirred for one hour, thus obtaining resin emulsion A1 having a nonvolatile solid content of 30%.

Production Example 2

Production of Resin Emulsion A2

First, 33 parts of deionized water and 1 part of an emulsifier (Dupanol WAQE, made by Witco Corporation) were placed into a four-necked flask as equipped with a stirrer, and the resultant mixture was heated to 70° C. in a stream of nitrogen while being stirred. Separately, an emulsified solution and an initiator solution were prepared, wherein the emulsified solution was obtained beforehand by emulsifying 20 parts of deionized water, 3 parts of the emulsifier, and an acryl monomer component which includes 85.0 parts of methyl methacrylate and 15.0 parts of isobutyl methacrylate, and wherein the initiator solution comprised 4.2 parts of deionized water and 0.2 part of ammonium persulfate. These solutions were added dropwise at 70° C. over a period of 2.5 hours, and further, the reaction is continued for 2.5 hours, thus obtaining resin emulsion A2 having a nonvolatile solid content of 40%. The transition temperature (° C.) of the acrylic resin moiety in resin emulsion A2 as obtained was 96° C.

Production Example 3

Production of Resin Emulsion A3

First, 12.0 parts of polypropylene chloride resin (chlorine content: 22 weight %, maleic anhydride moiety content: 1.5 weight %, and weight average molecular weight: 60,000) was beforehand added to an acryl monomer component which includes 85.0 parts of methyl methacrylate and 15.0 parts of isobutyl methacrylate, thus obtaining a mixed liquid. Resin emulsion A3 having a nonvolatile solid content of 40% was produced in the same way as of Production Example 2 except for changing the emulsified solution into the mixed liquid as prepared in the above way. The transition temperature (° C.) of the acrylic resin moiety in resin emulsion A3 as obtained was 96° C.

Production of Pigment Paste 56.4 parts of titanium dioxide, 1.8 parts of carbon black, and 41.8 parts of a water-soluble acrylic resin (nonvolatile solid content: 20%, made by Rohm & Haas Company) were dispersed with a sand mill for 30 minutes, thus obtaining a pigment paste having a nonvolatile solid content of 67%.

Resin emulsions A1 to A3 as prepared in the above way were used as a film-formable component, and the aqueous coating compositions according to the examples and comparative examples were produced in the following way.

EXAMPLE 1

A blending vessel equipped with a disper stirrer was charged with 11.2 parts of aqueous acrylic resin solution B1 (nonvolatile solid content: 20%, content of organic solvent: 0%, made by Rohm & Haas Company). Thereafter, the vessel was charged with 9.0 parts of resin emulsion A1 and 16.1 parts of resin emulsion A2 respectively while being stirred, and the resultant mixture was uniformly blended and dispersed. Then, the following components were added thereto in turn and blended and dispersed. The components were 7.6 parts of N-methylpyrrolidone, 9.9 parts of the pigment paste, 15.0 parts of deionized water, 15.0 parts of talc, 1.8 parts of a resin powder (ART PEARL U-600T, made by Negami Industry Co., Ltd.), 1.8 parts of a polyethylene wax (nonvolatile solid content: 35%, made by Rohm & Haas Company), 1.0 part of an acetylene diol defoamer (Surfinol 104, nonvolatile solid content: 50%, made by Air Products), 1.0 part of a silicone wetting agent (Coatosil 1211, nonvolatile solid content: 100%, made by Witco Corporation), and 3.0 parts of a thickener (ASE-60, nonvolatile solid content: 20%, made by Rohm & Haas Company). After dispersing the components, the maturation reaction was carried out for one hour. Then, 4.0 parts of a polycarbodiimde crosslinking agent (Carbodilite E-01, nonvolatile solid content: 40%, made by Nisshinbo Co., Ltd.) and 4.4 parts of deionized water were further added thereto while being stirred, thus obtaining an aqueous coating composition having a nonvolatile solid content of 40%.

EXAMPLES 2 to 4 AND COMPARATIVE EXAMPLES 1 TO 4

Aqueous coating compositions were produced in the same way as of Example 1 except that the kind and/or the content of the component each was changed according to Table 1.

As to the aqueous coating compositions of Examples or Comparative Examples as obtained in the above way, the coating workability thereof each was measured according to the following evaluation method. The results were shown in Table 1.

Evaluation for Aqueous Coating Composition

After washing a polypropylene test piece, an aqueous coating composition was air-spray-coated onto the test piece by a HVLP spray gun, and cured at 70° C. for 5 minutes such that the dried-film thickness would be 20 μm, thus obtaining a test piece covered with the coating film. Incidentally, the spray gun as used in the above way was Devilbliss AGX-V (made by ITW Industrial Finishing).

(Finishing State of Coating Film Surfaces):

The flatness of the coating film surfaces and the degree of blotchy appearance were judged with eyes. In addition, the tack on the coating film surfaces was judged by finger touch.

○: The coating film was flat and did not have a feeling of tack. The poor condition such as blotchy appearance was not caused on the coating film surfaces.

X: The coating film was not flat, or had a feeling of tack. The poor condition such as blotchy appearance was caused on the coating film surfaces.

(Sagging Performance):

The aqueous coating composition was diluted with deionized water to adjust a viscosity to 900 cps (25° C.). Thereafter, the resultant diluted paint was sprayed by a HVLP spray gun in an atmosphere of a relative humidity of 80%, and the limiting film thickness for sagging was measured.

○: The limiting film thickness for sagging was not less than 40μm.

X: The limiting film thickness for sagging was less than 40μm.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Resin emulsion A1 | 9.0 | 9.0 | 8.8 | 3.5 | 9.0 | 9.0 | 8.8 | 8.8 |
| Resin emulsion A2 | 16.1 | 16.2 | 15.8 | — | 16.2 | 16.1 | 15.9 | 15.9 |
| Resin emulsion A3 | — | — | — | 17.4 | — | — | — | — |
| Water-soluble acrylic resin B | 11.2 | 11.2 | 11.0 | 11.1 | 11.2 | 11.2 | 11.0 | 11.0 |
| N-Methylpyrrolidone | 7.6 | 7.7 | 7.5 | 7.6 | 7.7 | 7.6 | 7.5 | 7.5 |
| Pigment paste | 9.9 | 10.0 | 9.8 | 9.9 | 10.0 | 10.0 | 9.8 | 9.8 |
| Deionized water | 15.0 | 15.1 | 14.7 | 15.0 | 15.1 | 15.1 | 14.8 | 14.8 |
| Talc | 15.0 | 15.1 | 14.7 | 15.0 | 15.1 | 15.1 | 14.9 | 14.9 |
| Resin powder | 1.8 | 1.8 | 1.8 | 3.5 | 1.8 | 1.8 | 1.8 | 1.8 |
| Polyethylene wax | 1.0 | 1.0 | 1.0 | 1.0 | 1.0 | 1.0 | 1.0 | 1.0 |
| Acethylene diol defoamer | 1.0 | 0.6 | 1.8 | 1.0 | 0.4 | 1.0 | 2.2 | 1.0 |
| Silicone wetting agent | 1.0 | 0.8 | 1.8 | 1.0 | 1.0 | 0.7 | 1.0 | 2.2 |
| Thickener | 3.0 | 4.0 | 3.0 | 3.0 | 3.0 | 3.0 | 3.0 | 3.0 |
| Polycarbodiimde | 4.0 | 4.1 | 4.0 | 6.7 | 4.1 | 4.0 | 4.0 | 4.0 |
| Deionized water | 4.4 | 4.4 | 4.3 | 4.3 | 4.4 | 4.4 | 4.3 | 4.3 |
| Total | 100.0 | 100.0 | 100.0 | 100.0 | 100.0 | 100.0 | 100.0 | 100.0 |
| Finishing state of coating film surfaces | ○ | ○ | ○ | ○ | X | X | ○ | X |
| Sagging performance | ○ | ○ | ○ | ○ | ○ | ○ | X | ○ |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. An aqueous coating composition, which comprises:

a) an acetylene diol defoamer and a silicone wetting agent in addition to a film-formable component;

b) wherein the film-formable component includes a polypropylene chloride resin and a water-insoluble resin; and c) wherein a solid content of the acetylene diol defoamer is in a range of 0.25 to 0.75 weight % of the aqueous coating composition, and a solid content of the silicone wetting agent is in a range of 0.75 to 2.0 weight % of the aqueous coating composition.

* * * * *